United States Patent [19]
Wike, Jr. et al.

[11] Patent Number: 5,113,060
[45] Date of Patent: May 12, 1992

[54] SCANNING POINT-OF-SALE TERMINAL

[75] Inventors: Charles K. Wike, Jr., Ithaca, N.Y.; Richard E. Anderson, Norcross; Jerry A. McGaha, Gainesville, both of Ga.

[73] Assignee: NCR Corporation, Dayton, Ohio

[21] Appl. No.: 414,808

[22] Filed: Sep. 29, 1989

[51] Int. Cl.[5] .......................................... G06K 15/00
[52] U.S. Cl. .................................. 235/383; 235/385; 235/462; 235/472
[58] Field of Search ............... 235/472, 383, 385, 462; 177/50; 186/61

[56] References Cited

U.S. PATENT DOCUMENTS

| | | | |
|---|---|---|---|
| 3,018,947 | 1/1962 | Harruff | 235/472 |
| 4,071,740 | 1/1978 | Gogulski | 235/431 |
| 4,136,821 | 1/1979 | Sugiura et al. | 235/462 |
| 4,251,798 | 2/1981 | Swartz | 235/472 |
| 4,457,016 | 6/1984 | Pfeffer | 235/472 |
| 4,540,880 | 9/1985 | Hipko | 235/487 |
| 4,554,446 | 11/1985 | Murphy et al. | 235/487 |
| 4,652,732 | 3/1987 | Nickl | 235/462 |
| 4,762,984 | 8/1988 | Knowles et al. | 235/383 |
| 4,779,706 | 10/1988 | Mergenthaler | 186/61 |
| 4,787,467 | 11/1988 | Johnson | 177/50 |
| 4,791,281 | 12/1988 | Johnson et al. | 235/383 |
| 4,963,721 | 10/1990 | Kohno et al. | 235/462 |

Primary Examiner—Harold Pitts
Attorney, Agent, or Firm—Richard W. Lavin

[57] ABSTRACT

A point-of-sale data terminal device includes an optical scanning device mounted in one of the wall portions of the terminal device. In one embodiment of the invention, the scanning device is mounted in a support member which in turn extends outwardly from and is rotatably mounted in the wall portion enabling the support member to be oriented in a plurality of scanning positions. In a second embodiment of the invention, one or more scanning devices are mounted flush with a wall portion to project scanning light beams in a vertical and/or horizontal direction outwardly from the terminal device.

2 Claims, 5 Drawing Sheets

SCANNING POINT-OF-SALE TERMINAL

CROSS-REFERENCE TO RELATED APPLICATION

Reference is hereby made to co-pending U.S. patent application Ser. No. 386,377 filed Jul. 27, 1989 now U.S. Pat. No. 4,971,410 and assigned to the assignee of the present invention.

BACKGROUND OF THE INVENTION

This invention relates to optical scanning systems and more particularly to an optical scanning unit associated with a data terminal device utilized in merchandising checkout, transaction processing or self-service sale operations.

Present-day merchandising checkout systems found in supermarkets and the like normally employ an optical scanning unit located in a checkout counter and a data terminal device positioned adjacent the checkout counter. There has arisen a need to have the checkout system cover the smallest area possible while reducing the time it takes to check out a customer. It would also be desirable if the optical scanner could easily accommodate left or right-handed checkout operators.

SUMMARY OF THE INVENTION

In accordance with one embodiment of the invention, there is provided an optical scanning device mounted in one of the side walls of a data terminal device. The scanning device is mounted in a socket for rotational movement to provide a plurality of scanning positions. In a second embodiment of the invention, one or more scanning units are mounted in the data terminal device flush with the surface of one or more walls of the data terminal cabinet to provide a vertical and/or horizontal orientation of the scanning unit.

It is therefore a principal object of this invention to provide a data terminal device having a scanning unit mounted within the cabinet structure of the terminal device.

It is another object of this invention to provide a data terminal device having a scanning unit mounted within the cabinet structure of the terminal device which is adapted for movement to a plurality of scanning positions.

BRIEF DESCRIPTION OF THE DRAWINGS

These and other objects, features and advantages of the invention, as well as the invention itself, will become more apparent to those skilled in the art in light of the following detailed description taken in consideration with the accompanying drawings wherein like reference numerals indicate like or corresponding parts throughout the several views in which.

DESCRIPTION OF THE PREFERRED EMBODIMENT

Figure 1:
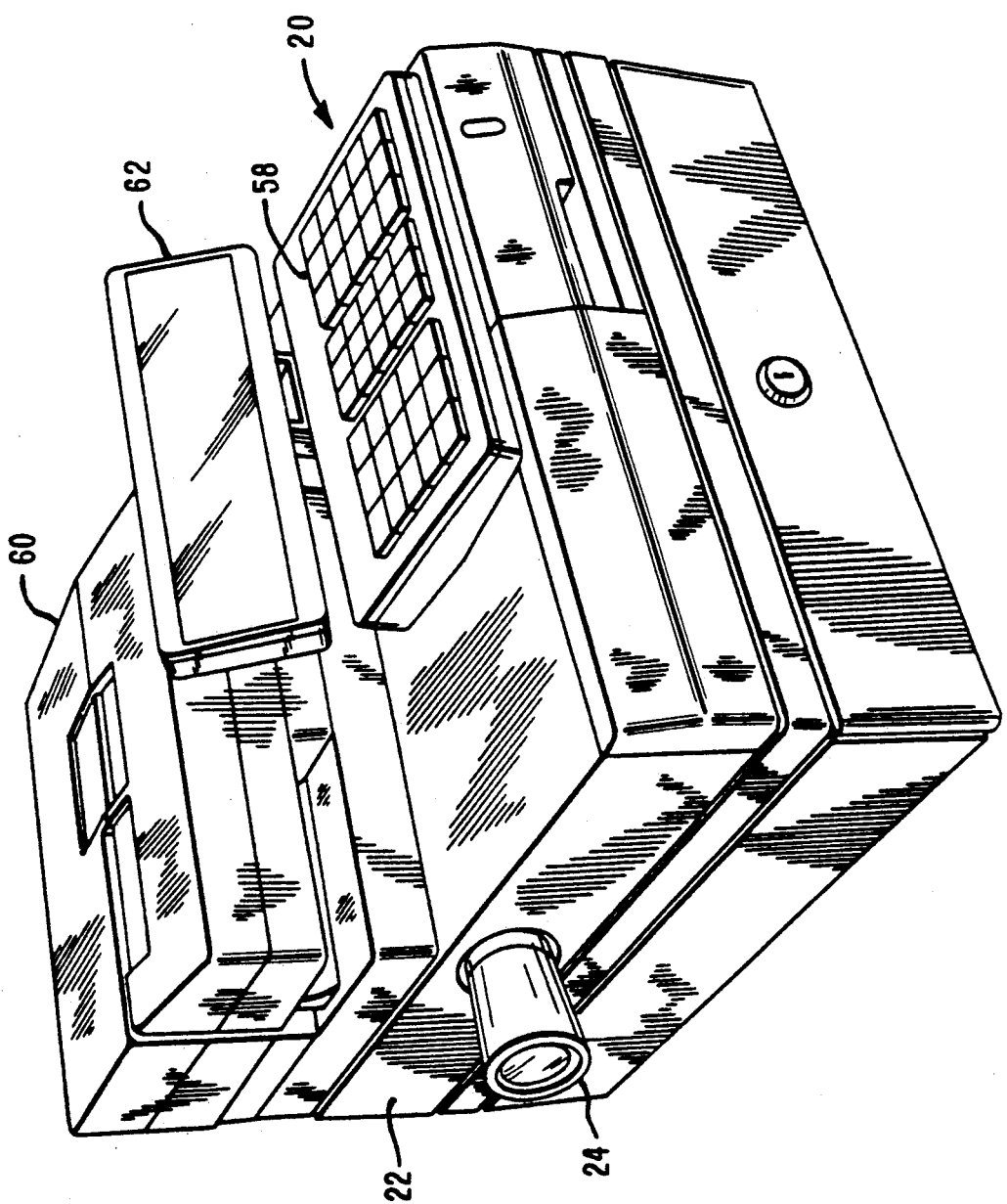
FIG. 1 is a perspective view of a data terminal device showing a scanning unit extending outwardly from a side wall of the terminal device.

Referring to the drawings, FIG. 1 is a perspective view of a terminal device generally indicated by the numeral 20 and includes a side wall 22 in which is mounted an optical scanning unit 24. The scanning unit 24 projects outwardly from the wall 22. As will be described hereinafter, the scanning unit is mounted for rotational movement enabling the checkout operator to manually position the scanning unit in a number of scanning positions depending on the needs of the operator.

Figure 2:
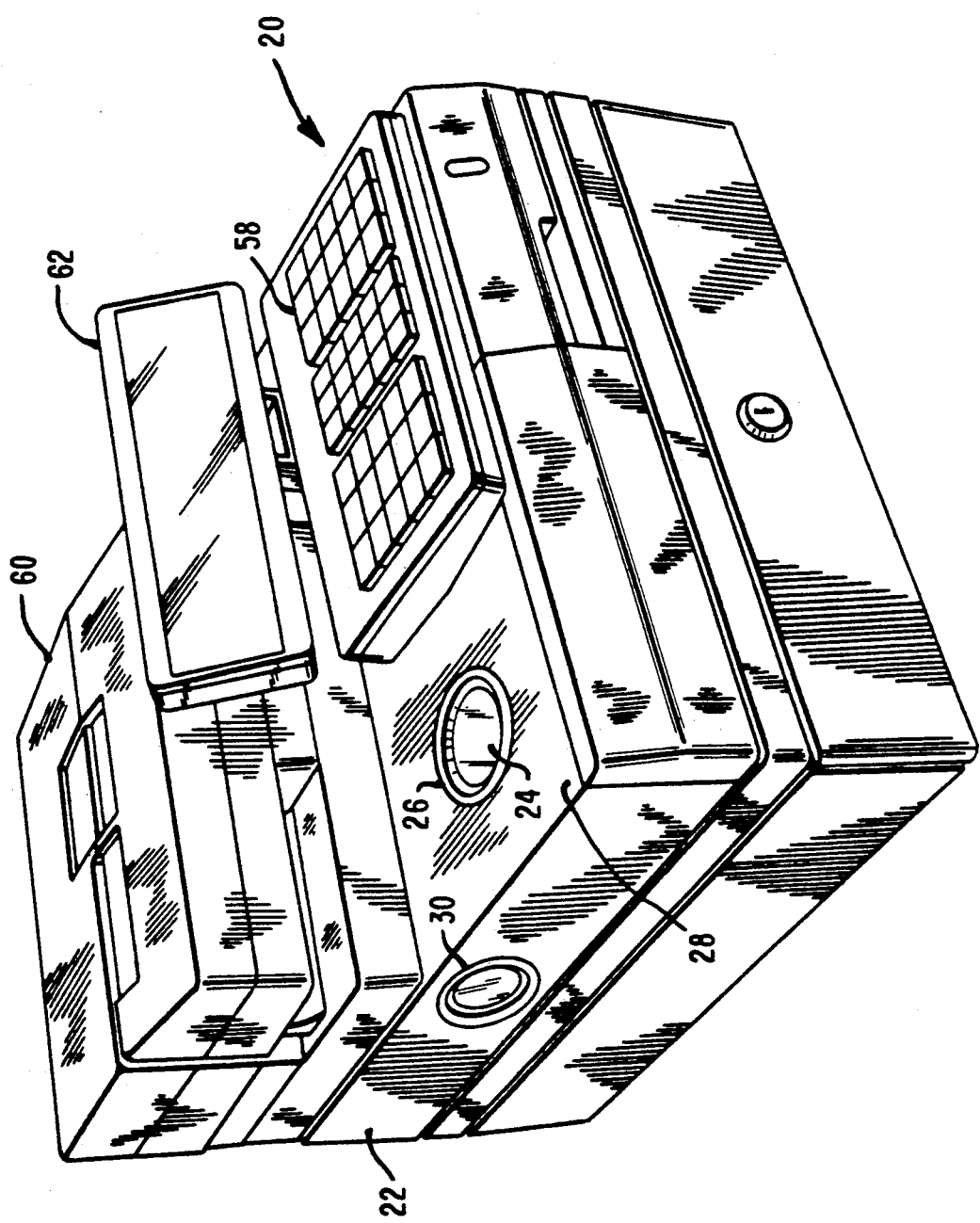
FIG. 2 is a perspective view of a data terminal device showing a scanning unit mounted flush with one of the walls of the terminal device.
Figure 6:
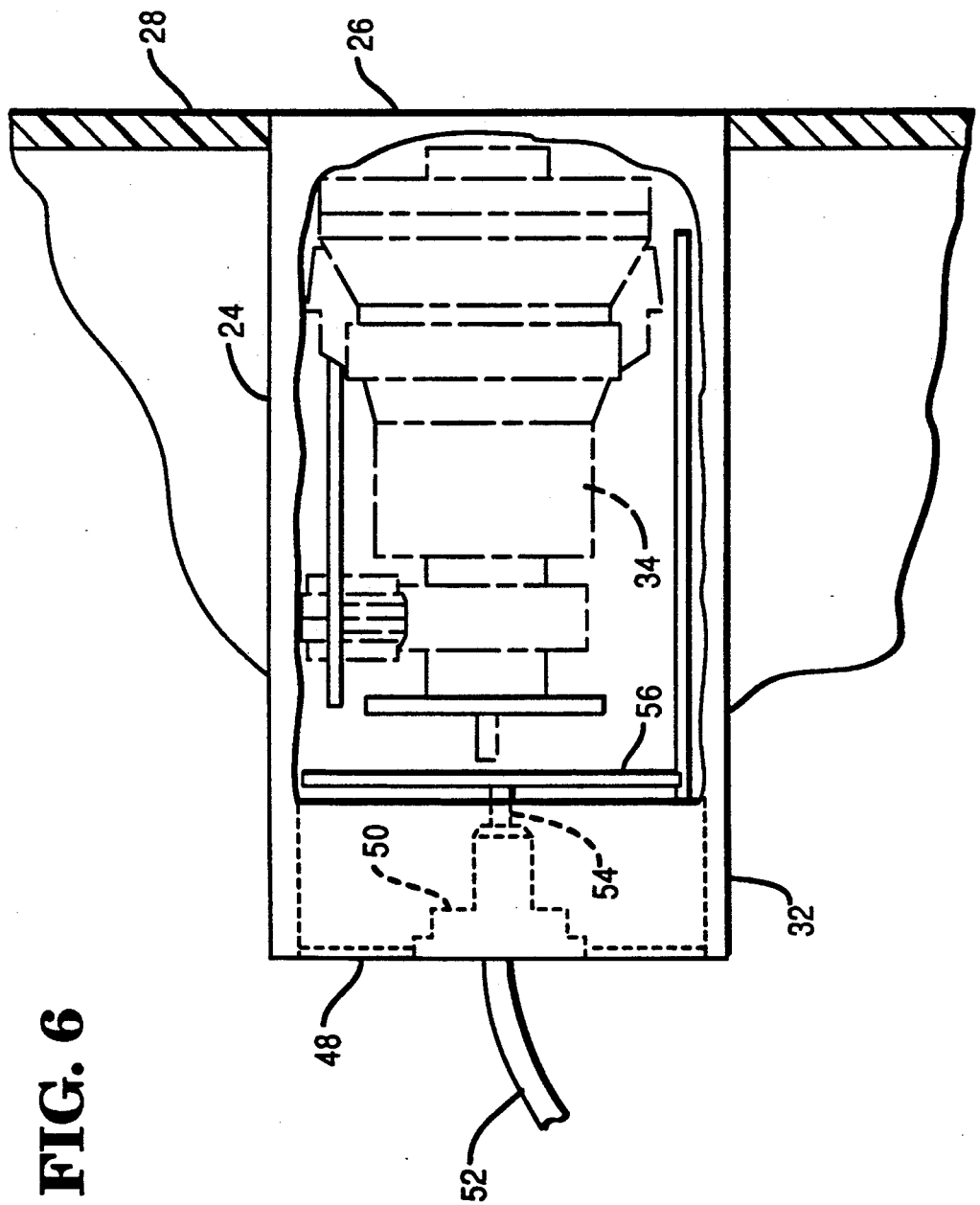
FIG. 6 is a partial side sectional view of one of the scanning units of FIG. 2 which is mounted flush with one of the walls of the terminal device.

FIG. 2 of the drawings is a similar view of the terminal device 20 shown in FIG. 1 but with the scanning unit 24 mounted within the terminal device with the face 26 of the scanning unit 24 flush with a wall of the terminal device. As shown in FIGS. 2 and 6, the face 26 of the scanning unit 24 is mounted flush with the surface of a top wall member 28. It is obvious that the scanning unit 24 may also be located in any of the wall members of the terminal device as is indicated by the scanning unit 30 shown located on the side wall 22. If required, two or more scanning units may be mounted within the terminal device as shown in FIG. 2. Further, it is obvious that the rotatable scanning unit 24 shown in FIG. 1 may be located in any of the wall members of the terminal device as indicated in FIG. 2 and that two or more of such scanning units may be mounted in the terminal device if desired.

Figure 3:
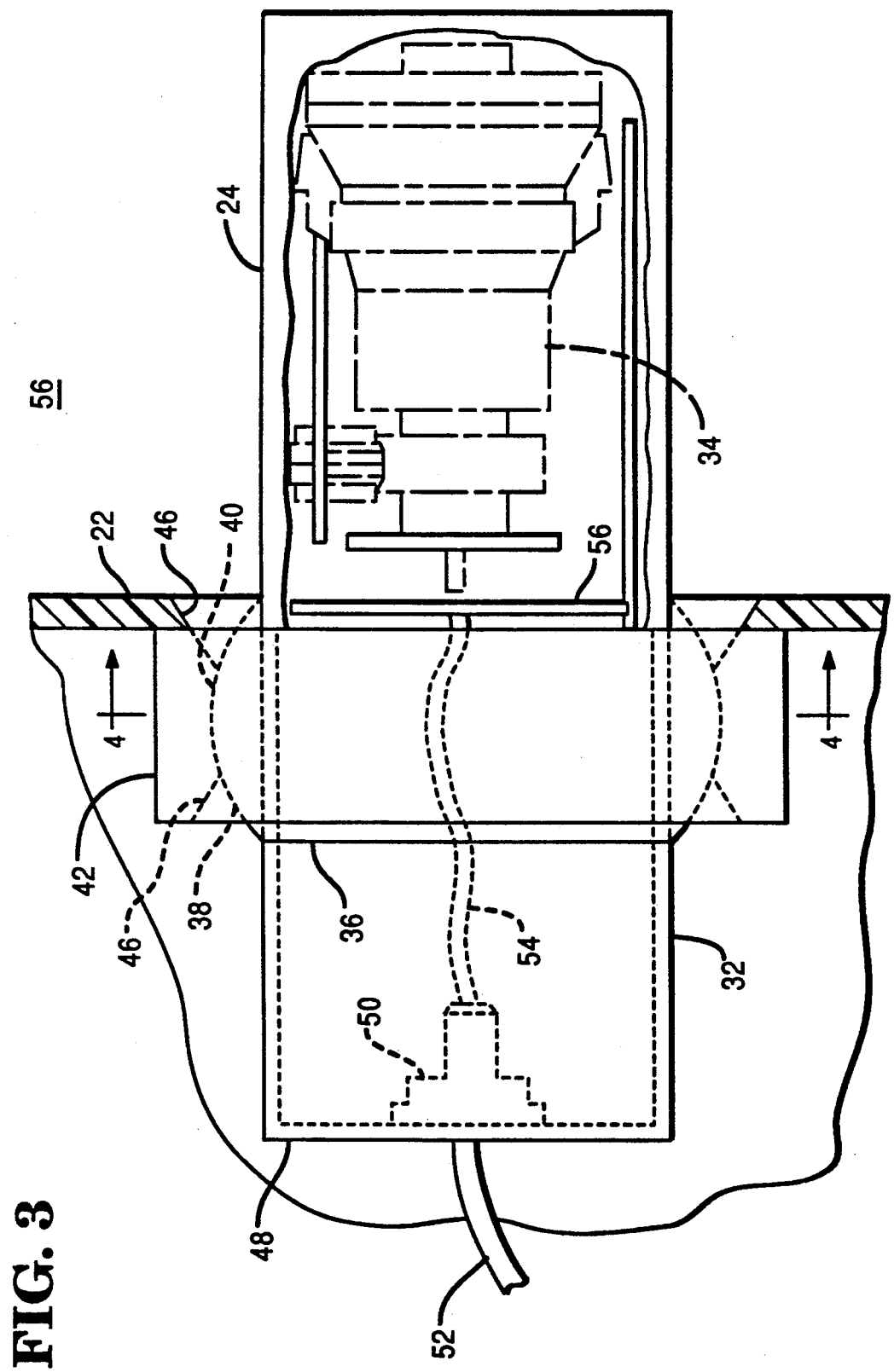
FIG. 3 is a partial side sectional view of the scanning unit of FIG. 1 showing the socket member mounted to the side wall of the terminal device enabling the scanning unit to be rotated to a plurality of scanning positions.
Figure 4:
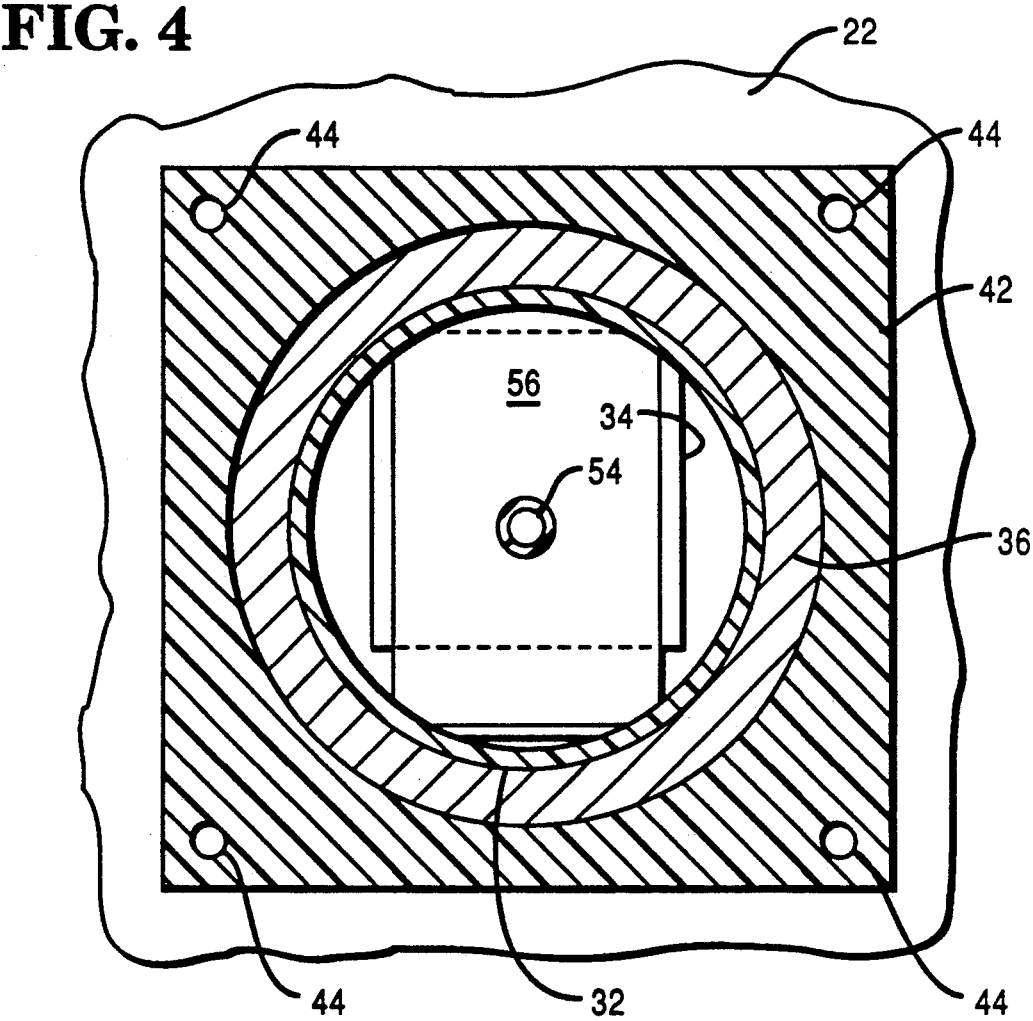
FIG. 4 is a sectional view taken on line 4—4 of FIG. 3 showing an end view of the socket member and the scanning unit.

Referring now to FIGS. 3, 4 and 6, there are shown views of the scanning unit 24 (FIG. 1) mounted within the terminal device 20. The scanning unit 24 comprises an elongated hollow casing member 32 within which is mounted a compact scanning unit 34 whose construction is fully disclosed in the previously cited patent application Ser. No. 386,377 which application is fully incorporated herein by reference. Secured to the outer surface of the casing member 32 is an annular shaped bearing member 36 having a circular surface 38 which slidably engages the correspondingly configured socket 40 of a support member 42 secured to the side wall member 22 by any conventional means such as screws 44 (FIG. 4). It will be seen that this construction enables the scanning unit 24 to be manually rotated in any direction within the socket 40.

The support member 42 includes a pair of opposed recessed annular surfaces 46 which are orientated to enable the scanning unit 24 to be rotated from a horizontal position to an angular position. In the present embodiment, the scanning unit can be rotated through 60 degrees. Secured to the rear wall member 48 of the scanning unit 24 is a plug member 50 to which is attached a power cable 52. A connecting cable 54 secured to the plug member 50 is connected to a printed circuit board 56 for supplying power to the scanning unit. In FIG. 6, the scanning unit 24 is shown mounted flush with the top wall member 28 (FIG. 2).

Figure 5:
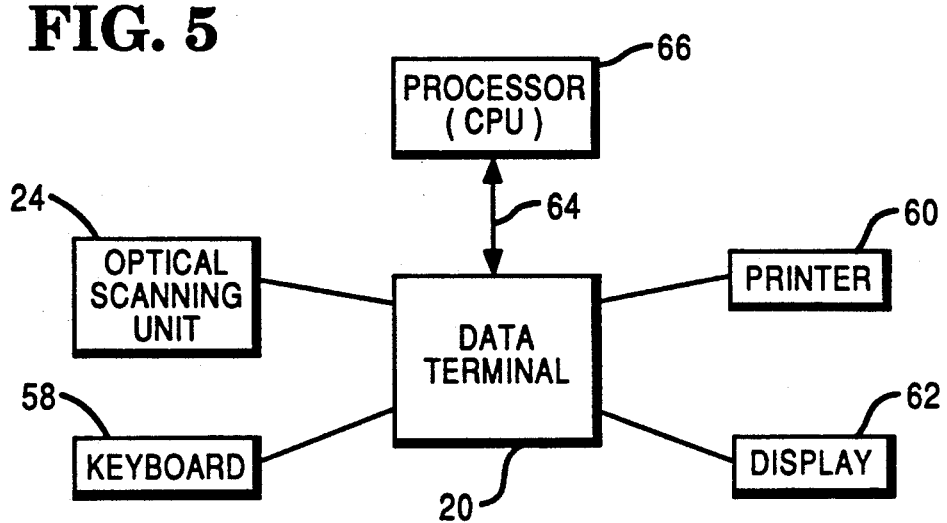
FIG. 5 is a block diagram of the data processing system of the present invention.

Referring to FIG. 5, there is shown a block diagram of the data processing system associated with the present invention. As shown, the data terminal device 20 receives data from the optical scanning unit 24 and the keyboard 58 (FIGS. 1 and 2) and controls the operation of the printer 60 and the display 62 (FIGS. 1 and 2) associated with the terminal device in a manner that is well known in the art. A remote processor (CPU) 66 is coupled over a cable 64 to the terminal device. During a checkout operation, the scanning unit 24 will scan a coded label (not shown) located on the purchased merchandise item thereby generating data identifying the purchased merchandise item. This data is transmitted to the terminal device 20. If the coded label is unreadable, the checkout operator will enter the same data utilizing the keyboard 58. The generated data is then transmitted from the terminal device 20 to the processor 66 over the cable 64. The processor 66 will look up the price of the purchased merchandise item using the received data. This price information is transmitted to the terminal device 20 which operates the printer 60 to print the price on a receipt record and operates the display 62 to display the price.

It will thus be seen that the data terminal device together with the scanning unit can be located anywhere in the supermarket to provide a checkout operation with the scanning unit being adjusted to provide the most convenient scanning position for the operator enabling the operator to checkout the purchased merchandise items in the minimum amount of time. While the terminal device has been described with respect to a supermarket environment, it is obvious that the the present embodiment of the terminal device may be used in other checkout environments such as fast food restaurants or in self-service environments in which the customer utilizes the scanning unit to read bar coded labels on purchased merchandise items or coded merchandising coupons.

While the principles of the invention have now been made clear in an illustrated embodiment, it will be obvious to those skilled in the art that many modifications of structure, arrangements and components can be made which are particularly adapted for specific environments and operating requirements without departing from those principles. The appended claims are therefore intended to cover and embrace any such modifications, within the limits only of the true spirit and scope of the invention.

What is claimed is:

1. In combination, a data terminal device for processing data having a top horizontal surface on which is mounted a keyboard and a display, a pair of opposed vertical wall portions and an optical scanning apparatus mounted in each of said horizontal surface and said vertical wall portions for projecting scanning light beams outwardly from said terminal device in a plurality of scanning directions, each of said scanning apparatuses comprising a support member in which is mounted an optical scanning device for projecting scanning light beams, said support member being rotatably mounted in said associated surface and vertical wall portions enabling the support member to be orientated in a plurality of scanning positions about an axis perpendicular to the associated horizontal surface and vertical wall portions of the data terminal device.

2. The combination of claim 1 in which said support member includes an annular bearing member and said combination further includes a socket member secured to said associated surface and vertical sidewall portions and in which is mounted for rotational movement the bearing member enabling the support member to be manually rotated to a plurality of scanning positions about an axis perpendicular to said associated surface and vertical sidewall portions.

* * * * *